No. 830,497. PATENTED SEPT. 11, 1906.
H. DAHL.
CIRCUIT CLOSING DEVICE FOR SPEED INDICATORS.
APPLICATION FILED JUNE 20, 1901.

3 SHEETS—SHEET 1.

No. 830,497. PATENTED SEPT. 11, 1906.
H. DAHL.
CIRCUIT CLOSING DEVICE FOR SPEED INDICATORS.
APPLICATION FILED JUNE 20, 1901.
3 SHEETS—SHEET 2
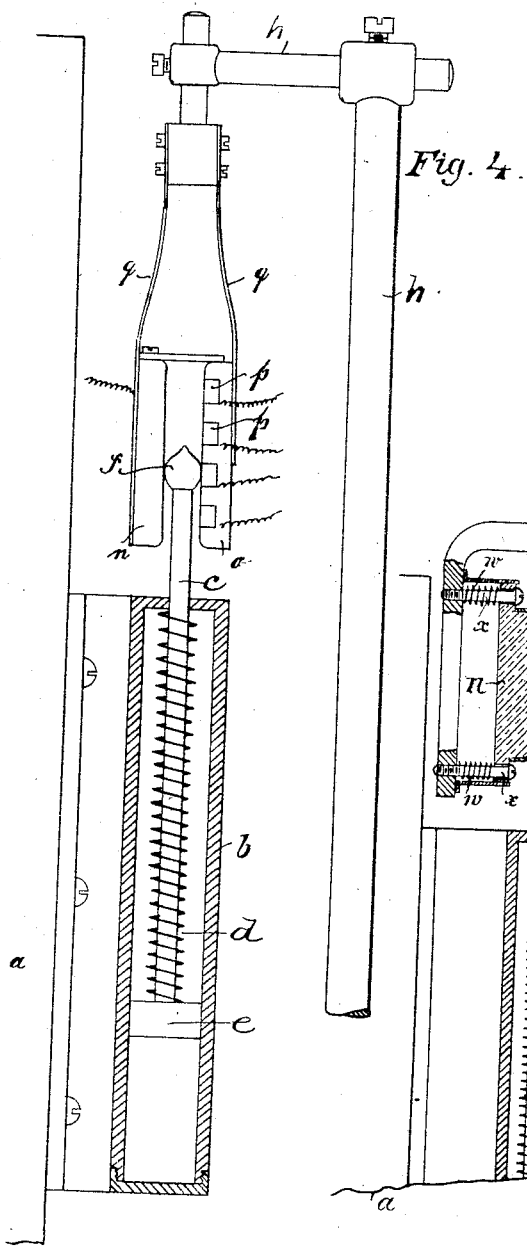
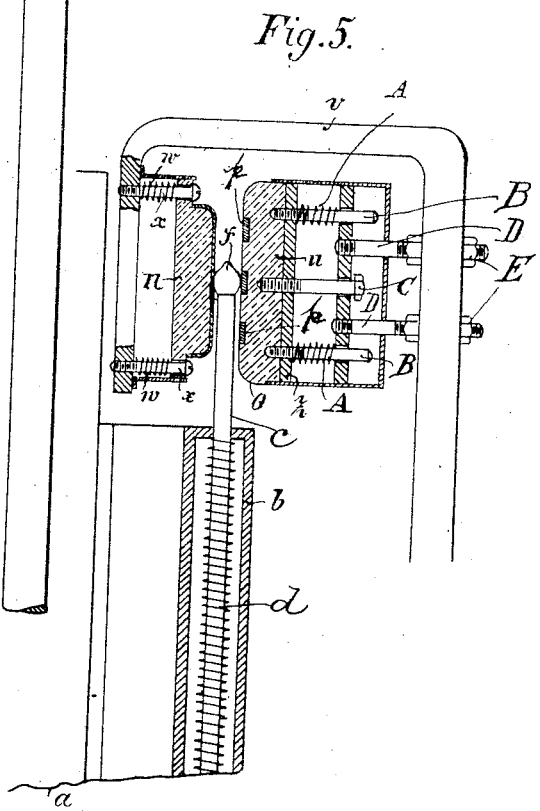

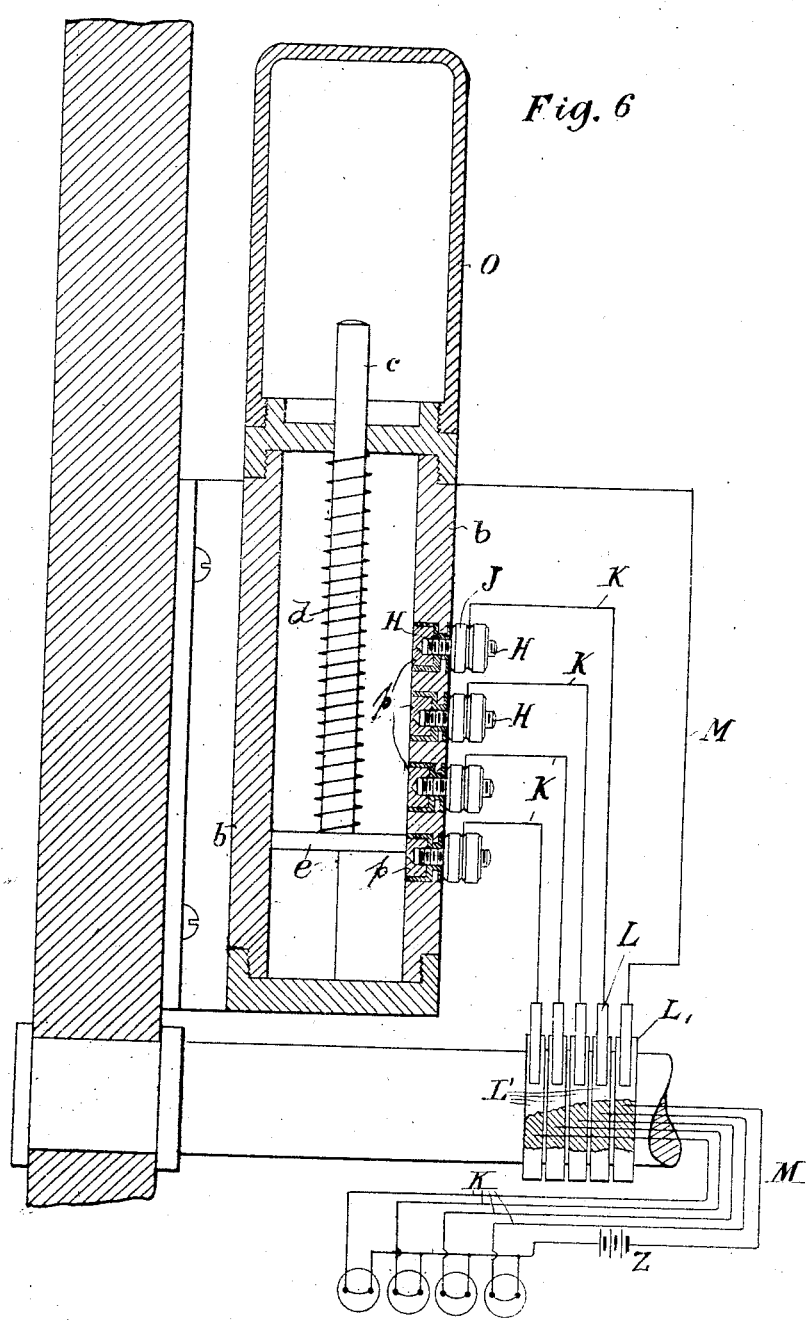

UNITED STATES PATENT OFFICE.

HANS DAHL, OF BERLIN, GERMANY.

CIRCUIT-CLOSING DEVICE FOR SPEED-INDICATORS.

No. 830,497.      Specification of Letters Patent.      Patented Sept. 11, 1906.

Application filed June 20, 1901. Serial No. 65,350.

*To all whom it may concern:*

Be it known that I, HANS DAHL, artist painter, a subject of the King of Sweden and Norway, residing at Berlin, in the Kingdom of Prussia and German Empire, have invented certain new and useful Improvements in Circuit-Closing Devices for Speed-Indicators, of which the following is a full, clear, and exact description.

My present invention relates to speed-indicators; and it has for one of its objects to provide a body actuated by centrifugal force to close one of several circuits, according to the speed of the rotating body.

Other objects and advantages will appear in the following description and will be particularly pointed out in the claims.

In the accompanying drawings four different embodiments of my invention are represented.

Figure 1:
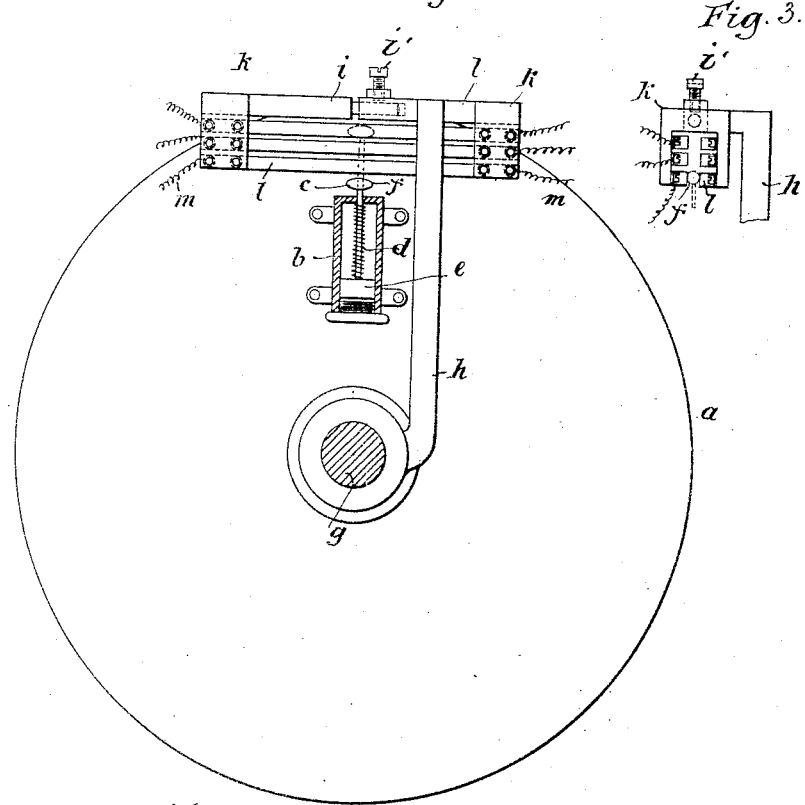
Figure 2:
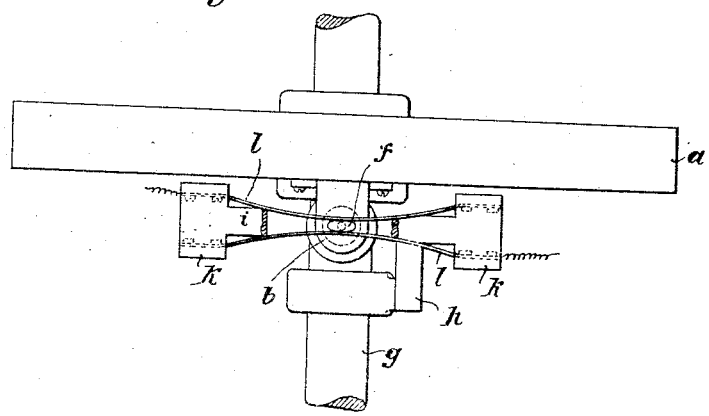

Figure 1 is a side elevation of a wheel provided with one embodiment of my invention. Fig. 2 is a plan, and Fig. 3 is an end view, of a part of the device shown in Fig. 1, while Figs. 4, 5, and 6 represent three other embodiments of my invention.

Figure 3:
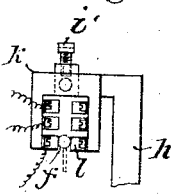

In the construction shown in Figs. 1 to 3 a casing $b$ is secured to the wheel or rotary body $a$. This casing $b$ contains the centrifugally-operated body $e$, which is kept in its normal position by a spring $d$. In this construction the body $e$ is combined with a rod $c$ and button $f$. When the wheel or body $a$ is rotated, the body $e$ will be moved by the centrifugal force toward the periphery and compress the spring $d$. On the axle $g$, on which the wheel $a$ rotates, is mounted a fixed frame or support $h$, which carries at its top end a transverse arm $i$. At both ends of this arm are provided forked pieces $k$, in which are secured in pairs a number of plate-springs $l$. Each pair of these springs $l$ diverges toward the ends secured in the forks $k$. When the body $e$ is moved in the casing $b$ by the centrifugal force, the button $f$ will be moved at the normal speed of the wheel between the lower pair of springs and in this manner close an electric circuit containing a signal device to be hereinafter described and which is thus operated. If the velocity of the wheel increases, the body $e$ will be moved further toward the periphery of the wheel and the button $f$ will arrive between the second pair of springs $l$ and close another circuit. It will be seen that by providing further pairs of springs other degrees of velocity may be indicated by the centrifugal force moving the button $f$. The rod $c$ of the contact device must of course be of such dimensions that when the button $f$ closes the circuit between the higher pairs of springs the rod can pass through the lower pairs without closing the circuits.

It is evidently not necessary to provide pairs of springs, as the springs on the one side may be connected together so as to form a single elastic plate, only the springs on the other side being separate. In order to adjust the distance between the springs $l$ where the button contacts therewith, one of the forks $k$ on the transverse arms $i$ may be so mounted as to be held in its adjustment by the friction-screw, such as the screw $i'$. (Shown in Fig. 1.)

Fig. 4 shows another embodiment of the device forming the subject-matter of my invention. In this construction the contact-pieces are arranged on cheeks $n$ $o$. The cheek $o$ consists of some insulating material, and plates or contact-pieces $p$ are let into it, each of said plates being connected with a source of electricity. The other cheek $n$ forms the second pole. Each of these cheeks $o$ $n$ is secured to a spring $q$, carried in a suitable manner by the support $h'$, carried by the frame $h$. In this construction the button $f$ also closes a circuit on coming between the cheek $n$ and one of the plates $p$ on the cheek $o$. The cheeks, together with their springs, can be adjusted in this support either toward or away from the periphery and the side of the wheel. If desired, a distance-piece or the like may be provided between the cheeks in order to keep them a sufficient distance apart.

In Fig. 5 another construction is shown. In this case a contact-piece $f$ is carried by the usual spring-controlled rod $c$ in the casing $b$, secured to the wheel $a$, and the contact-pieces are formed by elastically-supported cheeks, as in the previous construction. $n$ $o$ represent the cheeks, each of which is secured on an insulating-block. The cheek $n$ consists of a single plate which is elastically connected, together with the block of insulating material to which it is attached, to the support or frame $v$. This is done by means of the bolts or screws $x$, on which the spiral springs $w$ are coiled. The other cheek carries the plates $p$. The plates are let into the cheek $o$, which is secured to a plate $z$ and kept in its normal position by the springs $A$, coiled on the bolts $B$. By means of a screw $C$ the distance of the cheek o from the cheek n can be regulated. The whole cheek o can also be adjusted by means of the screws D and nuts E. In this construction the button f of the contact device closes circuits on arriving between and in contact with the cheek n and either one of the plates p. By means of a suitable casing the springs of the jaws n o may be inclosed, and thus protected from dust, &c.

In the construction shown in Fig. 6 there is no separate support or frame to carry the contact-pieces p. These contact-pieces p, as will be seen, are let into and insulated from the casing b and being broad or wide the contact will continue for some time—that is, will be of a duration sufficient to operate a signal continuously between two fixed speed limits. Screws H on the contacts carry nuts J, which hold the contacts in the casing and between which circuit-wires of the conductors K are held. These wires lead to brush-contacts L, supported in any suitable manner by the rotating parts and bearing against ring-contacts L' on the axle or relatively fixed support which carries the signaling mechanism to preserve the continuity of the circuit. In Fig. 6 the connection between the insulated contacts p with the casing b, which forms the other contact, is effected by the piston e. The signaling mechanism preferably employed (see Fig. 6) is adapted for all embodiments of my invention and consists of a series of lamps carried by a fixed support and each in circuit with one of the ring-contacts L', which are in circuit with the contacts p, Figs. 4, 5, and 6, or some of the contacts l, Figs. 1 to 3. The return of the battery Z is the conductor M, which is likewise connected by a ring-contact L' and a brush L to the other contacts l, Figs. 1 to 3, cheeks n, Figs. 4 and 5, or casing b, Fig. 6.

What I claim, and desire to secure by Letters Patent, is—

1. The combination with a rotating body, of a contact rotating with and moving outwardly from the axis of the rotating body by centrifugal force, spring means opposing the movement of the contact and electrical means for automatically indicating various positions of the contact accordingly to the speed of rotation.

2. The combination with a rotating body of a water and dust proof casing mounted on and rotating with the rotating body, a contact movable in the casing outwardly from the axis of the rotating body by centrifugal force, spring means opposing the movement of this contact, and an electrical contact mounted within the casing and adapted to be engaged by the movable contact-body.

3. In a speed-indicator, the combination with a rotary body, of a closed casing rotating with the body, a plurality of contacts arranged approximately radially to the axis of the rotary body, electrically-operated signaling devices, a series of circuits connecting the contacts with the signaling devices, and a centrifugally-operated sliding contact movable in the casing outwardly from the axis of the body to engage with the contacts and complete any one of the series of circuits.

4. In a speed-indicator, the combination with a rotary body, of a closed casing rotating with the body, a plurality of contacts arranged approximately radially to the axis of the body, electrically-operated signaling devices, a series of circuits connecting the contacts with the signaling devices, a centrifugally-operated sliding contact movable in the casing outwardly from the axis of the rotary body to engage with the contacts and complete any one of the series of circuits, and a spring opposing the movement in one direction of the centrifugally-operated body.

5. In a speed-indicator, the combination with a centrifugally-operated contact movable outwardly from an axis, of a contact rotating with the centrifugally-operated contact and engaged by the said centrifugally-operated contact to establish an electrical circuit.

6. In a speed-indicator, the combination with a centrifugally-operated contact movable outwardly from an axis, of a series of contacts rotating with the contact-body and successively engaged by said centrifugally-operated contact to establish a series of electrical circuits.

7. In a circuit-closer, the combination with a closed casing, of a centrifugally-operated sliding contact movable therein outwardly from an axis, a spring mounted in the casing opposing the movement of the sliding contact in one direction, and a series of contacts in the path of the sliding contact.

8. The combination with the closed casing, of a centrifugally-operated sliding contact movable in the casing outwardly from an axis, a spring mounted in the casing opposing the movement of the sliding contact device in one direction, and a series of broad contacts or contacts of duration mounted in the path of the sliding contact-body.

9. The combination with a rotary body, of a centrifugally-operated contact-body carried by and moving outwardly from the axis of the rotary body, electrically-operated signaling devices, a plurality of broad contacts or contacts of duration connected to the signaling devices, and mounted on the rotary body in the path of the centrifugally-operated body to cause each contact to operate the signaling device continuously between two fixed speed limits, and circuits connecting the signaling devices with the several contacts.

10. A rotary speed-indicator comprising in combination with a rotating body, a moving body driven outward from the axis of the rotating body by centrifugal force and founing one electric contact-pole, a series of contact-poles adapted to be engaged by the first contact-pole in such manner that a duration of contact is established with a fixed limit of commencement and a fixed limit of ending, and electrical signal devices actuated by these contacts of duration in such manner that a plurality of groups of speeds between two definite limits is indicated.

11. In a speed-indicator, the combination of a rotary support, a relatively fixed support, conductors forming parts of a circuit and carried respectively by each of said supports, a signal on said fixed support controlled by said circuit, mechanism mounted on said rotary support for governing said circuit and movable in different degrees thereon according to the different speeds of said support, and means to preserve the continuity of said circuit between said supports.

In witness whereof I hereunto subscribe my signature in presence of two witnesses.

HANS DAHL.

Witnesses:
G. HERZBERG,
HENRY HASPER.